United States Patent
Komori

(10) Patent No.: US 6,965,880 B2
(45) Date of Patent: Nov. 15, 2005

(54) TRANSACTION NUMBER MANAGEMENT METHOD IN NETWORK COMMODITY SALES

(75) Inventor: Masayuki Komori, Toyama (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 09/750,050

(22) Filed: Dec. 29, 2000

(65) Prior Publication Data

US 2001/0027421 A1 Oct. 4, 2001

(30) Foreign Application Priority Data

Mar. 30, 2000 (JP) ..................................... 2000-095157

(51) Int. Cl.⁷ ............................................. G06F 17/00
(52) U.S. Cl. ......................................... 705/75; 705/65
(58) Field of Search ........................... 705/75, 64, 65, 705/66, 67; 713/200, 201, 202; 235/375, 379, 462.15

(56) References Cited

U.S. PATENT DOCUMENTS

| 6,202,055 B1 * | 3/2001 | Houvener et al. ............. 705/44 |
| 6,341,353 B1 * | 1/2002 | Herman et al. ............. 713/201 |
| 6,487,285 B2 * | 11/2002 | Gilles et al. ............. 379/207.13 |
| 6,715,082 B1 * | 3/2004 | Chang et al. ............. 713/201 |

FOREIGN PATENT DOCUMENTS

| JP | HEI 3-038961 | 2/1991 | .......... H04M/11/00 |
| JP | 11-143954 | 5/1999 | .......... G06F/17/60 |
| JP | 411283341 A | * 10/1999 | |

OTHER PUBLICATIONS

IBM Technical Disclosure Bulletin; vol. 29; Jun. 1, 1986; Title: Multiple PC/5250 Sessions without unique code.*

* cited by examiner

Primary Examiner—Elisca Pierre Eddy
(74) Attorney, Agent, or Firm—Staas & Halsey LLP

(57) ABSTRACT

A cart ID according to the present invention is an identification code including receipt information containing at least a receipt number (serial number) indicating a receipt number of the transaction, and further unmeaning password information. Furthermore, it is preferable that the receipt information has date information in which the cart ID is issued. In this manner, the cart ID according to the present invention contains the password information in addition to the receipt information having conventional date information and the receipt number, whereby even when the cart ID is disclosed to the principal, it is possible to prevent another person from being informed thereof.

20 Claims, 12 Drawing Sheets

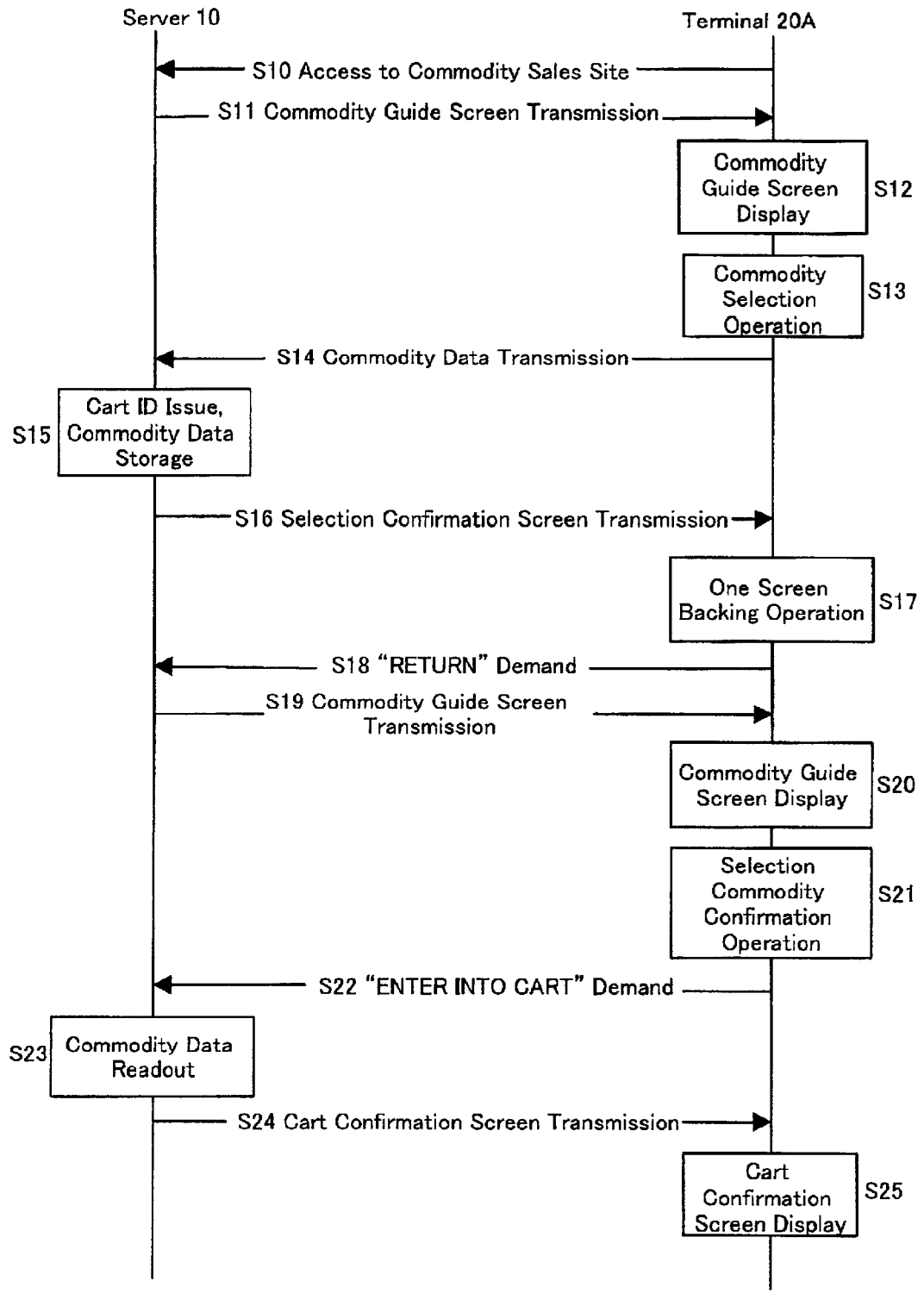

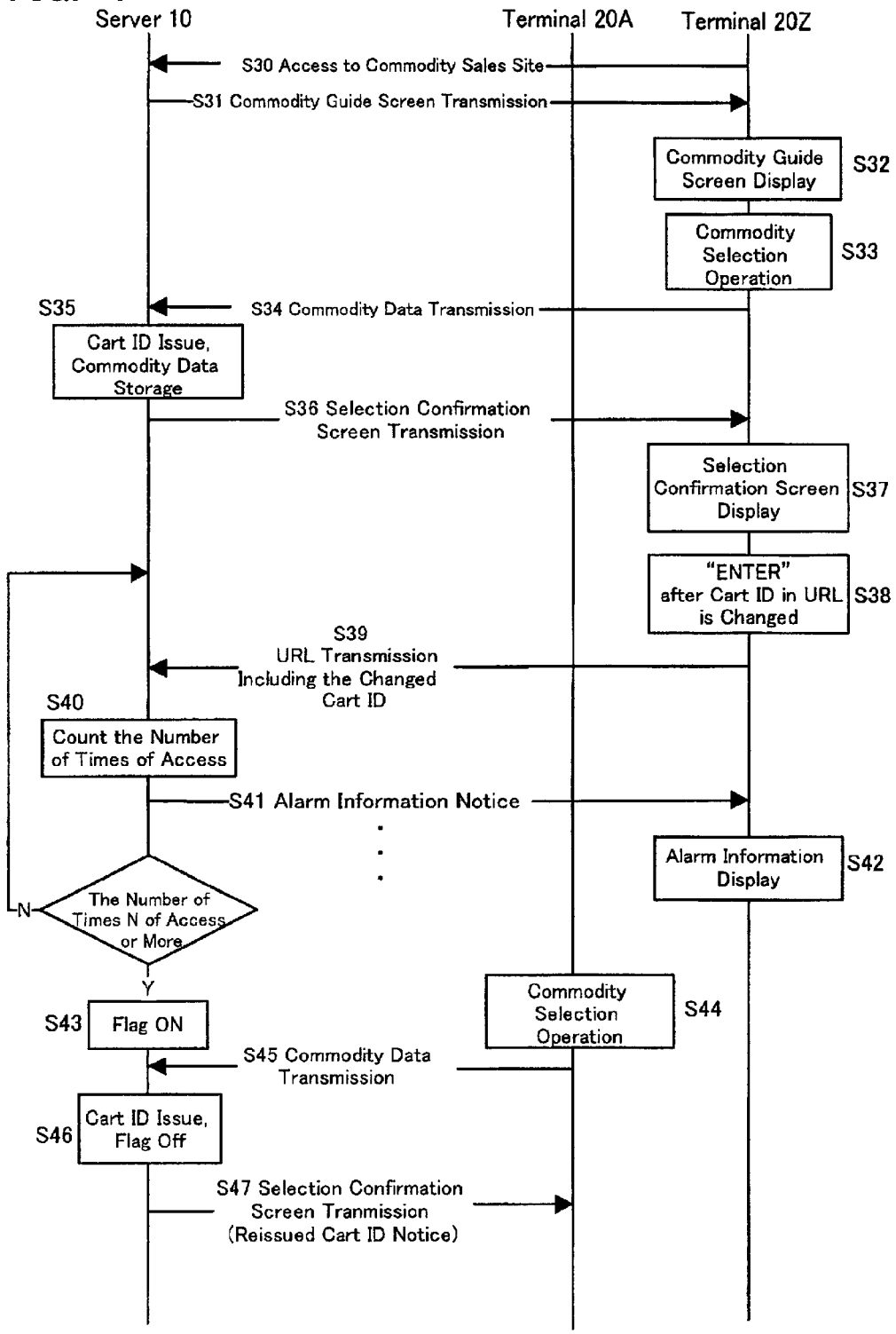

FIG. 5

SCREEN BEFORE ENTERING INTO CART

| address | http://webbp.s6.tfl.fujitsu.co.jp/pcsales/ui011?CART_ID=&SERIES_CODE=2 |

[ top ] [ main body ] [ peripheral unit* ]

site map / about legal information / about security / inquiry | shopping guide

[commodity selection] — [cart confirmation] — [payment] — [purchase procedure] — [purchase confirmation]

[payment guidance] — (enter into cart) — (purchase)

commodity amount: 0   carriage & consumption tax: 0   sum total: 0

---

Compact Model C series high performance condensed compact body & stylish design. Space saving, while securing expandability such as PCI slot.

| | |
|---|---|
| FMV-xxxx | Celeron [TM]-500-equipped 15-type CRT set model |
| FMV-OOOO | large screen and speaker integrated 15-type digital TFT liquid crystal set model |
| FMV-□□□□ | easy-to-look large screen & high precision 17-type full flat CRT set upper level model |
| FMV-△△△△ | Pentium [R] III-550E-equipped 15-type digital TFT liquid crystal upper level model |
| FMV-**** | Pentium [R] III-600E-equipped 15-type digital TFT liquid crystal supreme model |

FMV-DESKPOWER C3/505c

Celeron [TM]-500-equipped 15-type CRT set model

| | | |
|---|---|---|
| name of type | FMV-xxxx | FMV-xxx |
| pre-installation | ICHITARO | Office2000 |
| price | 269,000 | 278,000 |
| delivery period [?] | ○ | ◎ |
| CPU | Intel Celeron processor (500 MHz) | Intel Celeron processor (500 MHz) |
| memory | 64MB | 64MB |
| HDD | 20.4GB | 20.4GB |
| display | 15-type CRT | 15-type CRT |
| CD/DVD | CD-ROM | CD-ROM |
| others | | |
| quantity | [ 1 ] | [ 1 ] |
| purchase | (enter into cart) | (enter into cart) |

Being presently setting up.

[details]

SCREEN ENTER INTO CART BEFORE PLACING ENTER INTO CART

FIG. 7

SCREEN DISPLAYED AFTER PLACING ENTER INTO CART address http://webbp.ss.tf1.fujitsu.co.jp/pcsales/ui012?CART_ID=00022821261856637864&SERIES_CODE=2&WEB_STYLE=

| top | main body | peripheral unit | site map / about legal information / about security / inquiry | shopping guide commodity selection — enter into cart — purchase — cart confirmation — payment — purchase procedure — purchase confirmation payment guidance commodity amount: 269,000
carriage & consumption tax: 16,600
sum total: 285,600

The main body commodities selected by you are as follows:
You can here select peripheral units adapted for the selected main body.
If you desire to select peripheral units, depress a "peripheral units purchasing" button.
If you purchase only the main body, depress a "purchase" button and proceed to purchase procedure.

FMV—DESKPOWER C3/505c

Being presently setting up.

purchase of peripheral units         Display only the peripheral units adapted for the purchased commodity (main body).

Return        good bargain information

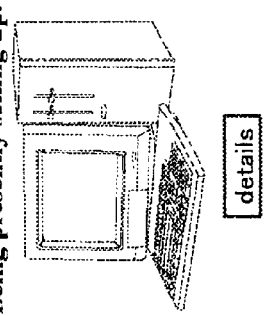
FIG. 8 ORIGINAL SCREEN AFTER PLACING ENTER INTO CART

FIG. 9

SCREEN ENTER INTO CART AFTER PLACING ENTER INTO CART

| address | http://webbp.ss.tf.fujitsu.co.jp/pcsales/ui200?CART_ID=0002282126185663786 4 |

| top | main body | peripheral unit | site map/about legal information/about security/inquiry | shopping guide commodity selection — cart confirmation — payment — purchase procedure — purchase confirmation

| payment guidance |

○ continue to purchase    ⊕ purchase commodity amount  | 269,000 |
carriage          | 3,000   |
consumption tax   | 13,600  | sum total | 285,600 |

Current in-cart condition.
· If you cancel ordered commodity, depress a cancellation button.
· If you desire to change quantity, change a numeric of the input quantity.
  If you end all changes, depress a change button.
If you confirm the below contents, depress a purchase button.
If you continue to purchase commodities, depress a shopping continuing button.

| cancellation | name of commodity | name of type | quantity | unit price | sum total |
|---|---|---|---|---|---|
| ▓▓ | FMV-XXXX ICHITARO model | FMV-XXXX/1 | 1 | 269,000 | 269,000 |

[quantity change]

TRANSACTION NUMBER MANAGEMENT METHOD IN NETWORK COMMODITY SALES

BACKGROUND OF THE INVENTION

1. Field of the Invention

The present invention relates generally to a transaction number management method in Internet commodity sale transactions, and more particularly, to security protection of transaction numbers.

2. Description of the Related Arts

Internet commodity sales are in a rapid spread. A user connects a terminal to Internet via a communication line, and displays a commodity sale site provided by a server managed by a commodity sale enterprise on a screen of the terminal.

The user operates the terminal, and selects a commodity which the user desires from a plurality of commodities displayed in the commodity sale site. The selected commodity data are noticed to the server, which temporally stores the data in a predetermined file until a purchase of the commodity is determined. Namely, the selected commodity data are temporally stored in the file of the server, and the condition is compared to a condition that the selected commodity is entered into a cart in contrast to a shopping at a conventional store. Therefore, this predetermined file is called a cart file.

In order to discriminate each cart, the server provides a transaction number (cart ID) to the cart file. Namely, the transaction number (cart ID) is provided to a single shopping transaction with the user. When the server receives commodity data selected first in a certain shopping of the user, it issues a new cart ID, and stores the commodity data selected in the cart file in response to the cart ID.

The issued cart ID is sent to the terminal, and is stored in the terminal by predetermined means. For example, the cart ID is stored in a memory unit (hard disk unit) of the terminal as a cookie. Alternatively, the cart ID is displayed on a terminal screen as a URL of a commodity sale site. Alternatively, the cart ID is written into a HTML document of the commodity sale site sent from the server. In this case, the HTML document may be constituted so as not to display the cart ID on the screen, but the cart ID written into the HTML document is held in the terminal.

When the user selects a next commodity, the commodity data are noticed to the server along with the cart ID. The server stores the commodity data in the cart file corresponding to the cart ID. In this manner, even in the case where the commodities are selected a plurality of times before confirming the purchase in a single shopping by the user, a plurality of the commodity data can be stored in the same cart file.

Meantime, in many cases, a conventional cart ID was constituted by, for example, date information such as an issue date, time, or the like and a receipt number of the cart ID. The receipt number is a serial number indicating a number of the cart ID issued in the order of transaction receipts on the date. For example, in the case where the 185-th cart ID on the date is issued at 9:26 p.m. on Feb. 28, 2000, the cart ID is "0002282126185." In this manner, it is possible to manage the cart ID in a uni-sense by utilizing the serial number for the cart ID, thereby facilitating the management of the cart ID.

However, the management of the cart ID by the receipt number causes a drawback in security. For example, in the case where such the cart ID is displayed as the URL at the terminal of the user, the user can readily know another person's cart ID. Accordingly, by inputting a digit code assumed as the another person's cart ID as the URL, there is a possibility that a shopping data connected with the another person's cart ID is acquired from the server, so that the user can see it. Furthermore, the user can alter another person's order, too.

In order to solve such drawbacks, it is considered that the cart ID is not displayed. Specifically, as described above, the cart ID is written into a memory unit of the terminal as a cookie, or is non-openly incorporated into the HTML document, so that the cart ID can be non-disclosed.

However, the non-disclosure of the cart ID causes the following inconveniences. Namely, in general, Internet sales enterprise has a support system which receives a user's questions by a telephone call. In the case where the user telephones in the transaction during a commodity selection, as the user cannot tell the own cart ID, the enterprise cannot judge which transaction the user is talking about, so the user can't get a smart and sufficient support.

Furthermore, in order to solve the aforesaid drawbacks, it is considered that the cart ID is encoded and the encoded ID is disclosed to the user. Namely, the cart ID containing information of a date, a time, and a receipt number is encoded by a password algorithm to form a random code, so that a sense included in the cart ID is not clarified to the user. Thus, it becomes difficult to analogize the other existent cart IDs.

However, encoding of the cart ID causes the below inconveniences. Namely, the encoding of the cart ID gives a large load on the server. Specifically, in the case where the cart ID is encoded, it is necessary to encode in the server and also decode, and for this reason, a surplus time has to be taken.

Furthermore, in the case where the user puts a question to the enterprise having the aforesaid support system by a telephone call, the user tells the disclosed encoded ID. Accordingly, unless the enterprise decodes it once and acquires the cart ID, the enterprise cannot grasp transaction information of the user corresponding to the cart ID. Therefore, the enterprise cannot correspond promptly to the user. In this manner, when the cart ID itself containing the serial number is not disclosed, the inconveniences are given to the user. It is thus undesirable.

SUMMARY OF THE INVENTION

It is therefore an object of the present invention to provide a method and apparatus for managing transaction numbers which can ensure the security, while laying open a cart ID (transaction number) containing a serial receipt number.

In order to attain the above object, a cart ID according to the present invention is an identification code including receipt information containing at least a receipt number (serial number) indicating a receipt number of the transaction, and further unmeaning password information. Furthermore, it is preferable that the receipt information has date information in which the cart ID is issued. In this manner, the cart ID according to the present invention contains the password information in addition to the receipt information having conventional date information and the receipt number, whereby even when the cart ID is disclosed to the principal, it is possible to prevent another person from being informed thereof. For example, even when a mala fide user shifts the receipt number, and acquires another person's cart ID, as the password information is a random code, so far as the password information is not also coincident, the another person's cart ID cannot be acquired. On the other hand, as the cart ID according to the present invention contains the date information and receipt number, it is possible to utilize instantly these numbers without being decoded.

To achieve the above object, according to an aspect of the present invention, there is provided a method of managing transaction numbers in commodity sale transactions via a network, the method comprising the steps of issuing a transaction number including receipt information and predetermined password information, the receipt information containing at least a receipt number indicative of the order of receipt of a predetermined transaction with a user; and displaying the transaction number on a terminal of the user.

For example, the network may be Internet and the transaction number may be displayed, as part of URL of Internet, on the terminal. Preferably, the receipt information of the transaction number contains date and time at issuance of the transaction number. Preferably, the password information of the transaction number contains a plural-digit random number. Preferably, the transaction number is issued when at least one commodity is selected at the terminal, the transaction number being utilized till the determination of purchase of the selected commodity. Preferably, the transaction number is issued when an access is made from the terminal to a system of the commodity sale transaction, the transaction number being utilized till the determination of purchase of the commodity. In those cases, the transaction number may be invalidated when a predetermined period of time elapses before the determination of purchase of the selected commodity after the issuance of the transaction number.

The method of the present invention preferably further comprises the step of, when another transaction number is received which coincides only with either the receipt information or password information of the transaction number, judging an improper access to the transaction number to erase the transaction number to reissue a new transaction number.

The method of the present invention preferably further comprises the steps of, when another transaction number is received which coincides only with either the receipt information or password information of the transaction number, judging an improper access to the transaction number to count the number of times of the access; and when a transaction number is received after the number of times of the access has reached a predetermined number of times, erasing the transaction number to reissue a new transaction number, and displaying the new transaction number on the terminal.

The method of the present invention preferably further comprises the step of, when another transaction number is received which coincides only with either the receipt information or password information of the transaction number, judging an improper access making use of the transaction number to delay a response to the terminal using the another transaction number.

The method of the present invention may further comprise the step of, upon detection of an improper access to the transaction number, notifying alarm information to a terminal which sent the another transaction number.

BRIEF DESCRIPTION OF THE DRAWINGS

FIG. 3 is a flowchart of a method of managing a cart ID according to the embodiment of the present invention;

FIG. 4 is a flowchart of the method of managing the cart ID according to the embodiment of the present invention;

FIG. 5 shows is an example of a screen displayed in a terminal 20;

FIG. 7 shows an example of the screen displayed in the terminal 20;

FIG. 8 shows an example of the screen displayed in the terminal 20;

FIG. 9 shows an example of the screen displayed in the terminal 20;

DESCRIPTION OF THE PREFERRED EMBODIMENTS

Preferred embodiments of the present invention will now be described. However, a technical scope according to the present invention is not limited to the embodiments of the present invention. In the embodiments of the present invention, a personal computer will be described as an example of a commodity which is sold on Internet.

Figure 1:
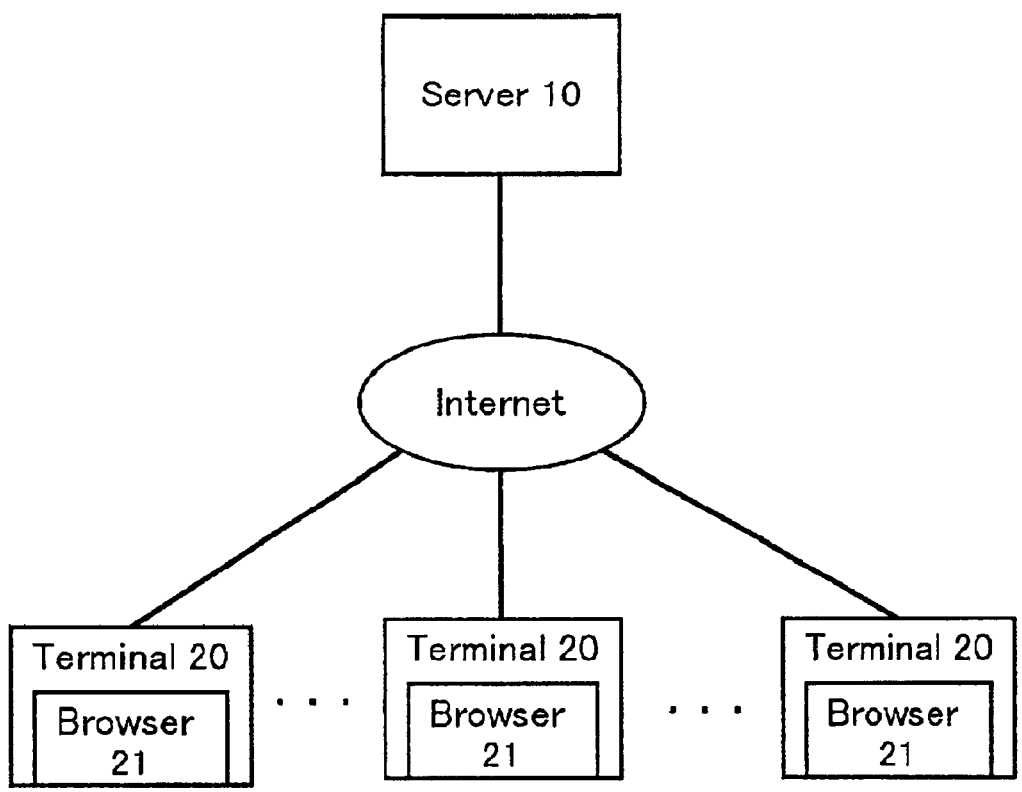
FIG. 1 is a diagram showing a structural example of a computer network according to an embodiment of the present invention.

FIG. 1 is a diagram showing a structural example of a computer network according to the embodiment of the present invention. In FIG. 1, a server 10 and a plurality of client terminals 20 are connected to Internet through a communication line. The server 10 is a server for providing Internet sales site according to the embodiment of the present invention, and storing a HTML file for the site, various programs and a database explained below, and the like. Each terminal 20 is, for example, a personal computer of a user, and comprises a control unit constituted by a CPU or the like, a display unit such as a CRT display, a liquid crystal display, or the like, and an input unit such as a key board, a mouse, or the like. Furthermore, the HTML file is acquired from the server 10 at the terminal 20, and a browser 21 for displaying it on the screen is installed.

Figure 2:
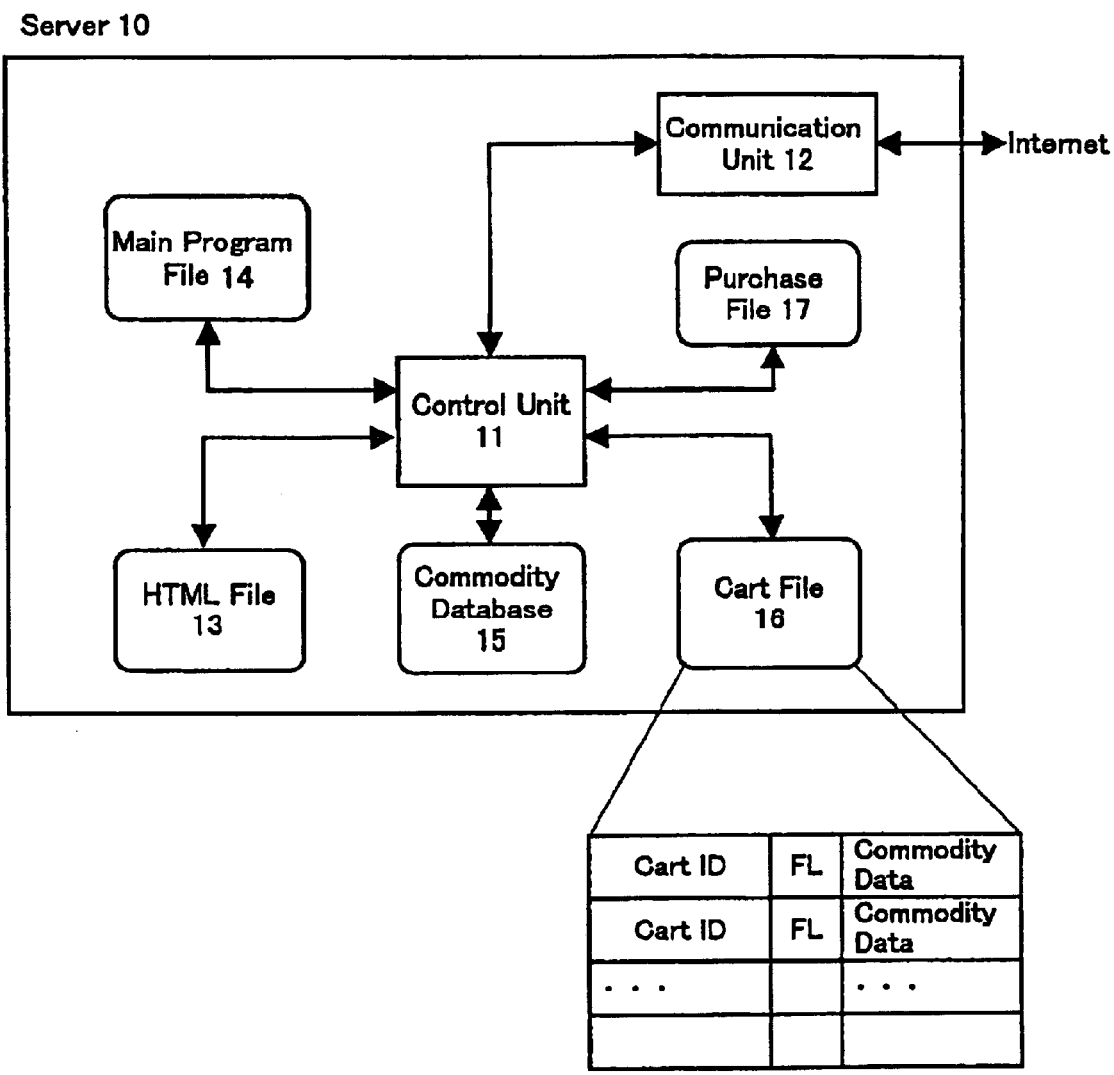
FIG. 2 is a diagram showing a structural example of a server 10.

FIG. 2 is a diagram showing a structural example of the server 10. A control unit 11 is constituted by the CPU or the like. The control unit 11 controls a readout of a file, a transfer of a file, each unit within the server 10, and retrieves a database, and issues the cart ID, and performs a managing process such as erasing or the like, and performs various operation processes. A communication unit 12 controls a transmission and receipt of files and data. For example, the communication unit 12 receives data from the terminal 20, and transfers them to the control unit 11, and further the files transferred from the control unit 11 are sent to the terminal 20. Furthermore, the following files are stored in a predetermined memory unit within the server 10.

A HTML file 13 is a file composed of a plurality of pages constituting Internet sale site, and is described by a HTML (HyperText Markup Language) language.

A main program file 14 has a program for reading out the HTML file to transfer it to the terminal 20; a program for processing data from the terminal 20; a program for retrieving a database; a program for burying the retrieval results in the HTML file; and a program for managing the cart ID.

A commodity database 15 stores a plurality of pieces of attribute information in response to all transaction commodities. For example, in the case where the commodity is a personal computer, the attribute information is a product name, a price, a type (desktop type or notebook type), and various functions of the personal computer. The functions are a type of a CPU, a capacity of a memory, a capacity of a hard disk, a type of a display, presence or absence of a CD-ROM or DVD-ROM, and the like. The attribute information of the commodity is converted into the HTML file, and is sent to the terminal 20, and is displayed on a screen of the terminal 20.

Furthermore, the server 10 comprises a cart file 16 for temporally storing commodity data selected by a user by operating the terminal 20; and a purchase file 17 for storing the commodity data in which the purchase is determined. The commodity data within the cart file 16 are managed according to a cart ID (transaction number) to be provided each time the user buys the commodity.

According to the embodiment of the present invention, this cart ID is an identification code containing receipt information containing at least a receipt number (serial number) indicating a receipt order of the transaction; and further unmeaning password information. Furthermore, it is preferable that the receipt information has date information in which the cart ID is issued. Namely, Cart ID=Date Information+Reception Number (Serial Number)+ Cipher Information In this manner, the cart ID according to the present invention contains the password information in addition to the receipt information having conventional date information and the receipt number, so that even when the cart ID is disclosed to the principal, it is possible to prevent another person from being informed thereof. For example, even when a mala fide user shifts the receipt number, and acquires another person's cart ID, as the password information is a random code, so far as the password information is not also coincident, the another person's cart ID cannot be acquired.

On the other hand, as the cart ID according to the present invention contains the date information and receipt number, it is possible to utilize instantly these numbers without being decoded. For example, when the user puts a question to a support center of an enterprise by a telephone call, the user tells the disclosed own cart ID, so that the enterprise can acquire the date information and receipt number (serial number) of the transaction without decoding the cart ID, and can promptly cope with the user.

FIGS. 3 and 4 are flowcharts of a method of managing the cart ID according to the embodiment of the present invention. Furthermore, FIGS. 5 to 10 are examples of a screen displayed in the terminal 20 in each step of the method of managing the cart ID. With reference to FIGS. 5 to 10, FIGS. 3 and 4 will be described.

In FIG. 3, first, a user A utilizes a browser 21 of a terminal 20A, and accesses Internet commodity sale site provided by the server 10 via Internet (S10). The server 10 sends, for example, the HTML file for a commodity guide screen to the terminal 20A in response to the access (S11). The terminal 20A displays the HTML file sent on the screen (S12). At this point of time, the cart ID is not issued.

FIG. 5 is an example of a commodity guide screen. On the screen, an explanation of a commodity (for example, a personal computer) is displayed. In FIG. 5, the user A inputs the quantity of the commodity, and clicks "Place the commodity on the cart", so that the commodity is selected (S13). The selected commodity data are sent from the terminal 20A to the server 10 (S14). The server 10 receives the commodity data. At this time, as the cart ID is not included in the commodity data in response to an initial commodity selection, the server 10 issues a new cart ID, and stores the commodity data in the cart file 16 together with the cart ID (S15).

The cart ID to be issued contains date information as an issue date and an issue time; a receipt number on the issue date; and predetermined password information. For example, in the case where the 185-th cart ID on the date is issued at 9:26 p.m. on Feb. 28, 2000, the cart ID is "00022821261856637864." of this digit code, "0002282126185" of the upper 13 digits is in sequence date information and a receipt number. "6637864" of the lower 7 digits is password information containing a random number generated at random. This password information is not a serial number, and the number has no specified sense.

Figure 6:
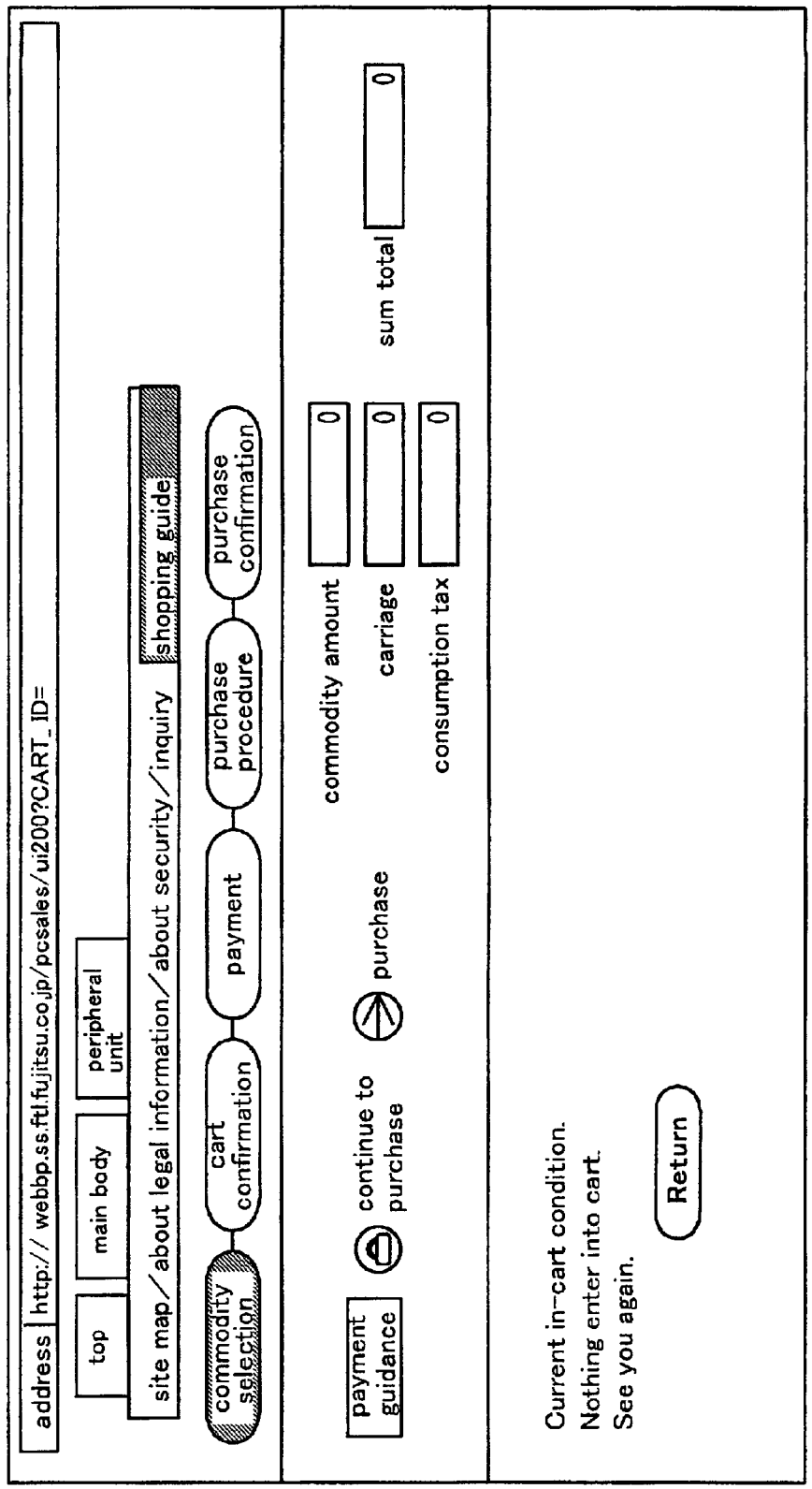
FIG. 6 shows an example of the screen displayed in the terminal 20.

Incidentally, when the user A clicks "In the cart" on the screen of FIG. 5 before the cart ID is issued, the screen shown in FIG. 6 is displayed. As the cart ID is not issued, the server 10 does not receive the cart ID together with a demand in response to "In the cart." The server 10 recognizes that the commodity is not selected, and the HTML file for the screen shown in FIG. 6 is sent to the terminal 20A.

When the server 10 stores the commodity data in the cart file 16, the server 10 sends the commodity data in response to the cart ID in the cart file 16 as the HTML file in order to identify the selected commodity (S16). FIG. 7 is an example of a selection identification screen. In FIG. 7, the name of commodity selected, etc. are displayed. Furthermore, the cart ID "00022821261856637864" is displayed as part of a URL in a URL display part in the screen. Thus, the user A can know the cart ID in response to a present shopping.

Here, the user A operates to return the screen to a previous screen (clicks "Return" in an operation menu of an browser not shown) (S17). The terminal 20A sends a demand corresponding to "Return" together with the cart ID (S18). Then, the server 10 sends the HTML file corresponding to the same commodity guide screen (FIG. 8) as the screen of FIG. 5 as a screen prior to the present screen together with the cart ID (S19). The terminal 20A displays the screen of FIG. 8 corresponding to the sent HTML file (S20). On the screen of FIG. 8, the cart ID is displayed in the URL display part. In this manner, once the cart ID is issued, the cart ID is added to the data communicated between the server 10 and terminal 20A. Accordingly, even when the screen is changed during the user A's selection of the commodity, the cart ID is always displayed in the URL display part of the screen, and the user A can look at the cart ID.

The user A clicks "In the cart" of FIG. 8 in order to identify the selected commodity in the present shopping (S21). The terminal 20A sends a demand corresponding to "In the cart" together with the cart ID (S22). The server 10 receives the cart ID together with the demand. The server 10 reads out the commodity data managed by the received cart ID from the cart file 16 (S23), and sends the HTML file for the commodity identification screen in which the commodity data are buried together with the cart ID (S24). The terminal 20A displays the commodity identification screen of FIG. 9 in response to the sent HTML file (S25). On the screen of FIG. 9, the commodity data stored in the cart in response to the present cart ID are displayed. Of course, the cart ID is displayed in the URL display part. Here, the user A clicks "Continue the shopping" of FIG. 9, to display the other commodity guide screens (not shown), and continues a commodity selection.

Referring then to FIG. 4, while the user A selects a commodity, the server 10 is accessed at a terminal 20Z of a mala fide user Z. Specifically, similar to the case of the user A, the terminal 20Z accesses Internet commodity sale site provided by the serer 10 via Internet (S30). The server 10 sends, for example, the HTML file for the commodity guide screen to the terminal 20Z in response to the access (S31). The terminal 20Z displays on the screen of FIG. 5 in response to the sent HTML file (S32). At this point of time, the cart ID has not been yet issued.

The user Z inputs the quantity of commodity selected arbitrarily, and clicks "Place it in the cart" (S33). Thus, the commodity is selected and the commodity data are sent to the server 10 (S34).

When the server 10 receives the commodity data, a new cart ID is issued, and the commodity data are stored in the cart file 16 together with the cart ID (S35). The receipt number included in the issued cart ID is later than the receipt number included in the cart ID of the user A. Furthermore, the date information included in the cart ID of the user Z is the same time as that in the user A, or a time (or a date) later than that in the user A. Furthermore, the password information included in the cart ID of the user Z is a number which has no connection with that of the user A.

When the server 10 stores the commodity data in the cart file 16, the commodity data corresponding to the cart ID in the cart file 16 are sent as the HTML file in order to confirm the selected commodity (S36). The terminal 20Z displays the selection identification screen of FIG. 7 (S37). However, the cart ID displayed as a part of the URL in the URL display part is an ID issued to a shopping of the user Z.

Here, the user Z changes some part of the cart ID displayed in the URL display part. For example, assume that the cart ID of the user Z is "0002821266186XXXXXXX." Namely, the cart ID of the user Z is issued at the same time as that of the user A, and has a next number of the receipt number of the user A. Furthermore, the lower 7 digits "XXXXXXX" of the cart ID of the user Z is the password information containing a random number generated at random by the server 10 as described above.

The user Z changes "186" as a receipt number part of the cart ID to a previous number "185." Furthermore, the user Z presumes that the date information is same as in the user A, and the date information is not to be changed. Thus, the date information and receipt number part of the cart ID displayed on the screen of the terminal 20Z of the user Z are coincident with those of the user A. However, as the user Z cannot expect at all a password information part of the cart ID of the user A, an arbitrary number "YYYYYYY" is given. This number is a number different from the password information of the cart ID of the user A.

The user Z changes the displayed cart ID to "0002282126185YYYYYYY," and depresses an "ENTER" button of the terminal 20Z (S38). Thus, a demand of the HTML file in response to the URL containing the cart ID is sent to the server 10 (S39). When the server 10 receives the demand from the terminal 20Z, it searches the interior of the cart file 16 for the received cart ID. However, the received cart ID does not exist. The received cart ID coincides with the cart ID of the user A in the date information and receipt number part, but as the password information part is different, they do not coincide with the cart ID.

Figure 10:
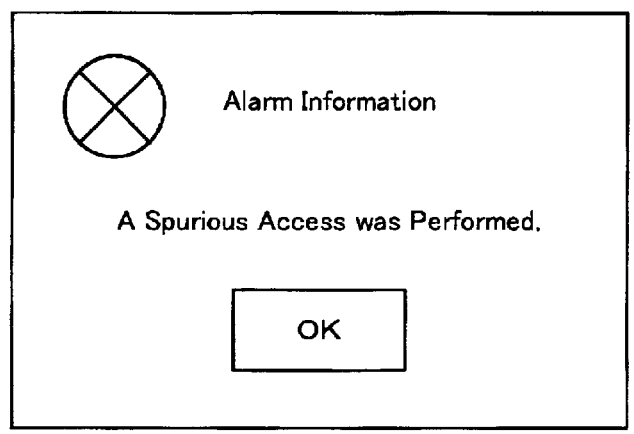
FIG. 10 shows an example of the screen displayed in the terminal 20.

When the server 10 judges that the received cart ID is different from the cart ID of the user A in only the password information part, the server 10 recognizes that an improper access is performed to the cart ID of the user A, and counts improper access every cart ID (S40). Furthermore, the alarm information is sent to the terminal 20Z of the user Z (S41). At the terminal 20Z, the alarm information shown in FIG. 10 is displayed overlaid on the screen displayed currently (screen of FIG. 6) (S42). The alarm information is vanished from on the screen by clicking an OK button of FIG. 10.

Incidentally, in the case where both of the date information and receipt number part of the received cart ID and the password information part are not coincident with either of those of the cart ID in the cart file 16, the server 10 does not count the number of times of the access and notices only the alarm information. Incidentally, in the case where the cart ID which coincides with only the password information part of the received cart ID exists in the cart file 16, the server 10 judges that the improper access is done, and counts the number of times of access in the cart ID as a target of the improper access. Similarly, the alarm information is notified.

The user Z erases the alarm information, and changes the password information to another digit code again, and repeats the access to the server 10. Namely, steps S38 to S42 are repeated. Each time the improper accesses are repeated, the alarm information shown in FIG. 10 is displayed. Therefore, the user Z has to operate to erase it. Accordingly, it is possible to delay the improper access by the user Z.

As the password information part has a plurality of digits containing a random number (7 digits in this embodiment), the probability is extremely low that the password information of the cart ID input at a guess by the user Z coincides with that of the cart ID of the user A. Each time the server 10 judges that it is an improper access, the server 10 counts the number of times of accesses. When the number of times of the improper accesses to the cart ID of the user A reaches N times (for example, three times), the server 10 erects a flag (FL) for the cart ID of the user A in the cart file 16 (S43). When the server 10 erects the flag for the cart ID, when the server 10 next receives the cart ID, the server 10 erases the cart ID from the cart file 16 and reissues another cart ID.

Assume that, in a condition that a flag is erected in the cart ID of the user A, the user A per se accesses the server. This is, for example, the case where the user A selects an additional commodity on the commodity guide screen, and clicks "Place it in the cart" (S44). In this case, the cart ID of the user A is sent to the server 10 together with the commodity data (S45). As a flag is erected in the cart ID of the user A in the cart file 16, when the server 10 receives the cart ID of the user A, the server 10 invalidates the received cart ID of the user A (preferably, erases it), and reissues the cart ID of the user A (S46). Furthermore, the flag erected is lowered. The server 10 sends the HTML file of the selection identification screen (FIG. 7) containing the cart ID reissued to the terminal 20A.

The cart ID reissued has the date information and receipt number at the time of re-issuance, and further contains the password information containing a random number generated newly. Accordingly, the date information and receipt number part of the cart ID of the user A reissued are different from them in the ex-cart ID of the user A, and the cart ID containing a number called "185" in the receipt number part does not exist in the cart file 16. Accordingly, even when the user Z tries to access many times, the improper access is never succeeded.

In this manner, the cart ID according to the embodiment of the present invention has the date information and receipt number as well as the password information. Since the password information contains a random number having no specific sense, it is impossible to decode another person's password information part in effect. Accordingly, even when the date information and receipt number part are disclosed, the improper access can be prevented. According to the embodiment of the present invention, further, in the case where the number of times of the improper access reaches the predetermined one, in order to make perfection more perfect in security of the cart ID, the cart ID as a target of the improper access is reissued. Specifically, as described above, when the server detects an access by the cart ID in which the date information and receipt number coincide with each other, but the password information does not coincide with each other, or an access by the cart ID in which the date information and receipt number do not coincide with each other, but the password information coincides with each other, the server 10 recognizes it as the improper access to the really existing cart ID containing the coincident part, and counts the number of times of access. After the number of times of access to the cart ID as a target of the improper access reaches the predetermined number of times, when the server 10 detects the access by the cart ID, the server 10 erases the cart ID and reissues a new cart ID. Thus, as the cart ID as the target of the improper access does not exist, the improper access can fully be prevented.

Figure 11:
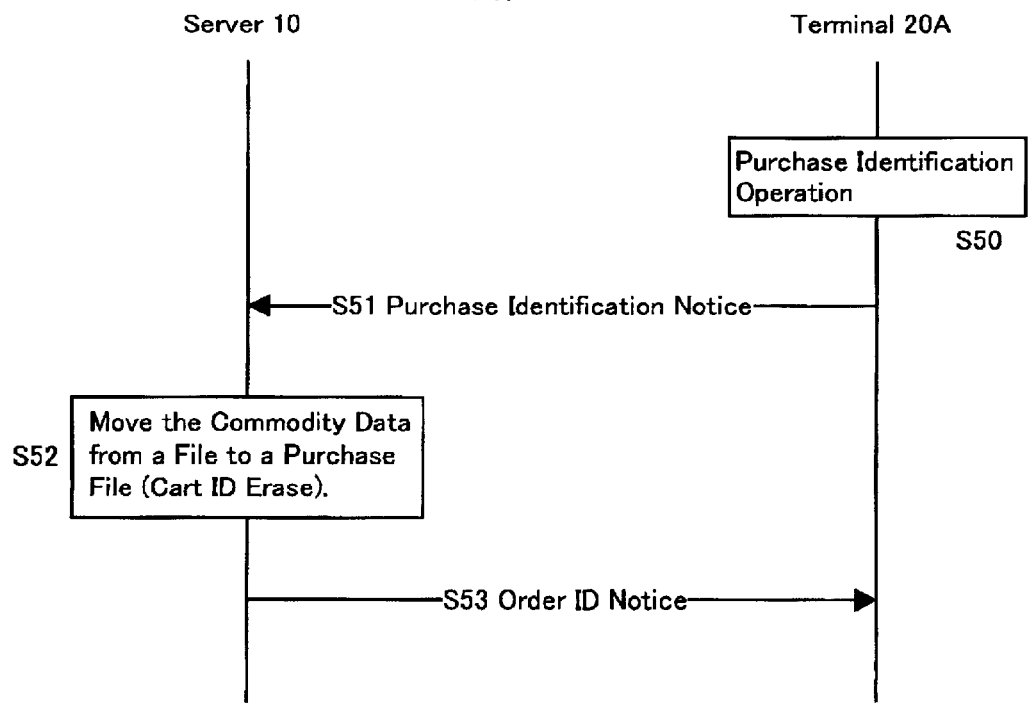
FIG. 11 is a flowchart of an order confirmation process.

FIG. 11 is a flowchart of an order confirmation process by the user A. In FIG. 11, when the user A ends a commodity selection, the user A clicks a "Purchase" button on the screen of FIG. 7, 8, or 9 (S50). The purchase confirmation notice is sent to the server 10 together with the cart ID (S51). When the server 10 receives the purchase confirmation notice, the server 10 transfers the commodity data managed by the received cart ID to a purchase file 17 in the cart file 16 (S52). Namely, the cart ID and commodity data are erased from the cart file 16. On the other hand, the commodity data transferred to the purchase file 17 are managed by an order ID to be newly issued.

When the commodity data are stored in the purchase file 17, it is impossible to change the purchase after the point of time. Because the purchase file 17 is an access disable file. On the other hand, the cart file 16 is a file which can be accessed by the terminal 20 so as to cancel the once selected commodity, and add, change, or the like the commodity to be purchased. Accordingly, there is a danger of the improper access from the other users, and according to the aforesaid embodiment, the improper access to the accessible cart file 16 is prevented.

The server 10 sends the HTML file in response to a purchase confirmation screen (not shown), and notices the order ID to the user A (S53). Furthermore, the purchase confirmation may separately be noticed by an electronic mail. Alternatively, it may be noticed by a mail service.

Furthermore, according to the embodiment of the present invention, when a predetermined period of time or more has elapsed from the issue time before the issued cart ID is erased by the aforesaid purchase confirmation, the issued cart ID may automatically be erased. The predetermined period of time is, for example, 2 days (48 hours). In the case where the user selects the commodity and places the commodity data in the cart file 16, while the user disconnects the transaction, in order to clear the transaction, the server 10 erases the commodity data and cart ID in the cart file 16 corresponding to the transaction.

Accordingly, after a predetermined period of time or more has elapsed from the issue time of the cart ID, even when the user desires to continue the disconnected transaction, the cart ID and commodity data are erased in the cart file. Therefore, the user cannot continue to transaction. It is assumed that the user has doubts about the matter and telephones to the support center. Even in this case, the terminal of the user displays the cart ID issued prior to the disconnection of the transaction by a history storage function of the browser. Accordingly, the user can send the displayed cart ID to the support center. As the cart ID includes time information at the time of the issue, the support center can forthwith judge that 2 days or more have elapsed after the issue of the cart ID, and can promptly answer the user that the transaction is cleared. In the case where the cart ID is non-displayed, or is all encoded as in the prior art, in order to perform a retrieval process or decode process of the cart ID, it is necessary for the user to wait for a while during the telephone call. However, according to the embodiment of the present invention, it is possible to promptly answer the user, and contribute to enhance a service of the support center.

Next, a method of managing the cart ID according to another embodiment of the present invention will be explained.

Figure 12:
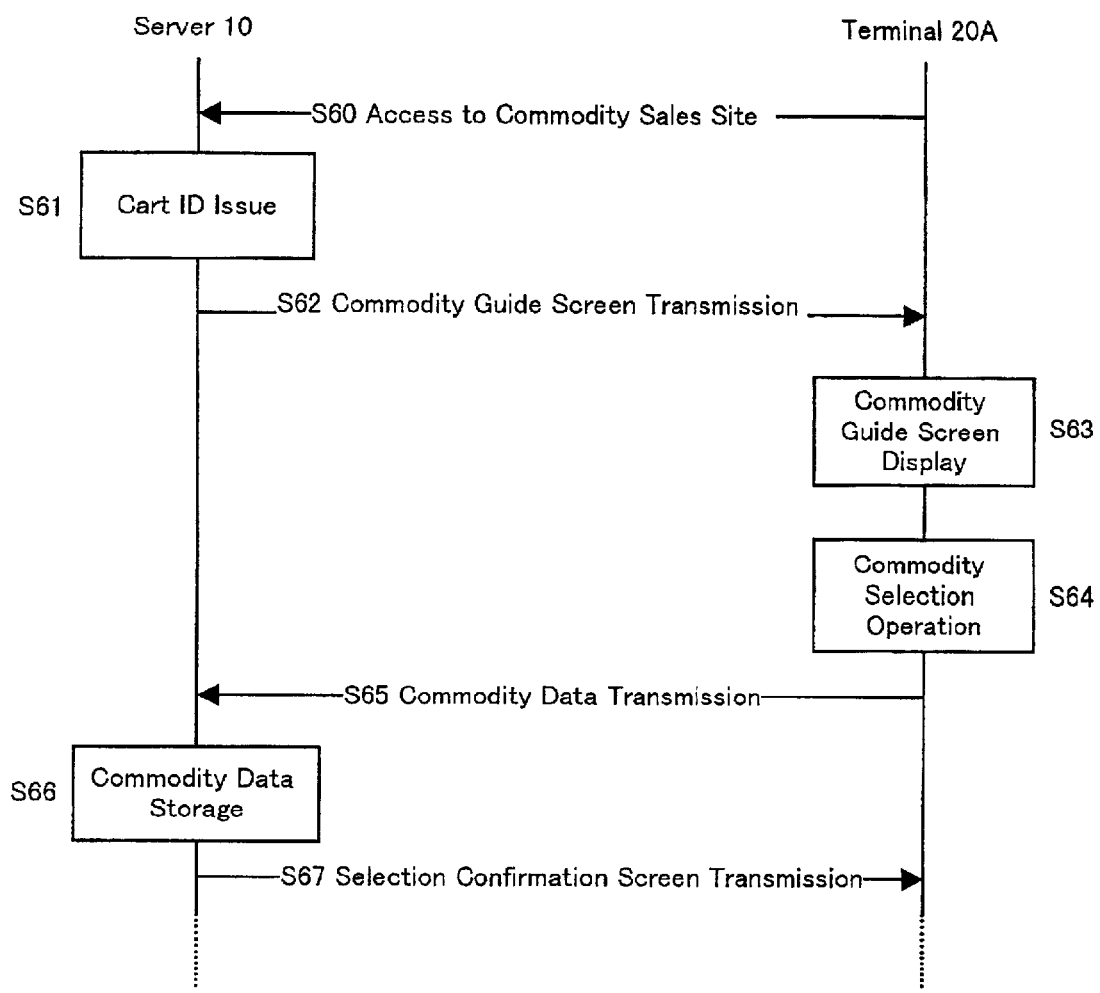
FIG. 12 is a flowchart of a method of managing the cart ID according to another embodiment of the present invention.

FIG. 12 is a flowchart of the method of managing the cart ID according to another embodiment of the present invention. Incidentally, only a characteristic process part according to this embodiment will be described, and the other processes are same as a process content explained by use of FIGS. 3 and 4. Therefore, the description is omitted.

In the process of the embodiment in FIGS. 3 and 4, the cart ID is issued at the point of time when a commodity is selected. On the contrary, this embodiment differs mainly in that the cart ID is issued at the point of time when Internet commodity sale site provided by the server 10 is accessed by the terminal 20A.

In FIG. 12, first, the user A utilizes the terminal 20A (browser 21) to access Internet commodity sale site provided by the server 10 via Internet.

The server 10 newly issues the cart ID in response to the access and stores it in the cart file 16 (S61). A form of this cart ID and a method of forming it are same as in the aforesaid embodiment.

Furthermore, the server 10 sends to the terminal 20A the HTML file for the commodity guide screen containing the cart ID issued newly (S62).

The terminal 20A displays the sent HTML file on the screen (S63). The cart ID is displayed as part of the URL in the URL display part of the commodity guide screen displayed.

When the user A selects the commodity (S64), the selected commodity data and cart ID are sent from the terminal 20A to the server 10 (S65).

The server 10 stores the commodity data in the corresponding cart file 16 based on the cart ID received together with the commodity data from the terminal 20A (S66).

Furthermore, in order to identify the selected commodity, the server 10 sends the HTML file for the selection identification screen to the terminal 20A (S67).

According to the aforesaid embodiment, when returning to a condition prior to issuing the cart ID by utilizing the history storage function of the browser after the cart ID has been issued, such a phenomenon occurs that the cart ID is not displayed in the URL display part.

On the contrary, according to this embodiment, since the cart ID is issued at the point of time when the user accesses the commodity sale site, as far as perusing a page within this site, the cart ID is always displayed in the URL display part, so that it becomes possible to prevent the occurrence of the phenomenon.

Furthermore, another embodiment in a countermeasure method of the improper access in FIG. 4 will be described.

Figure 13:
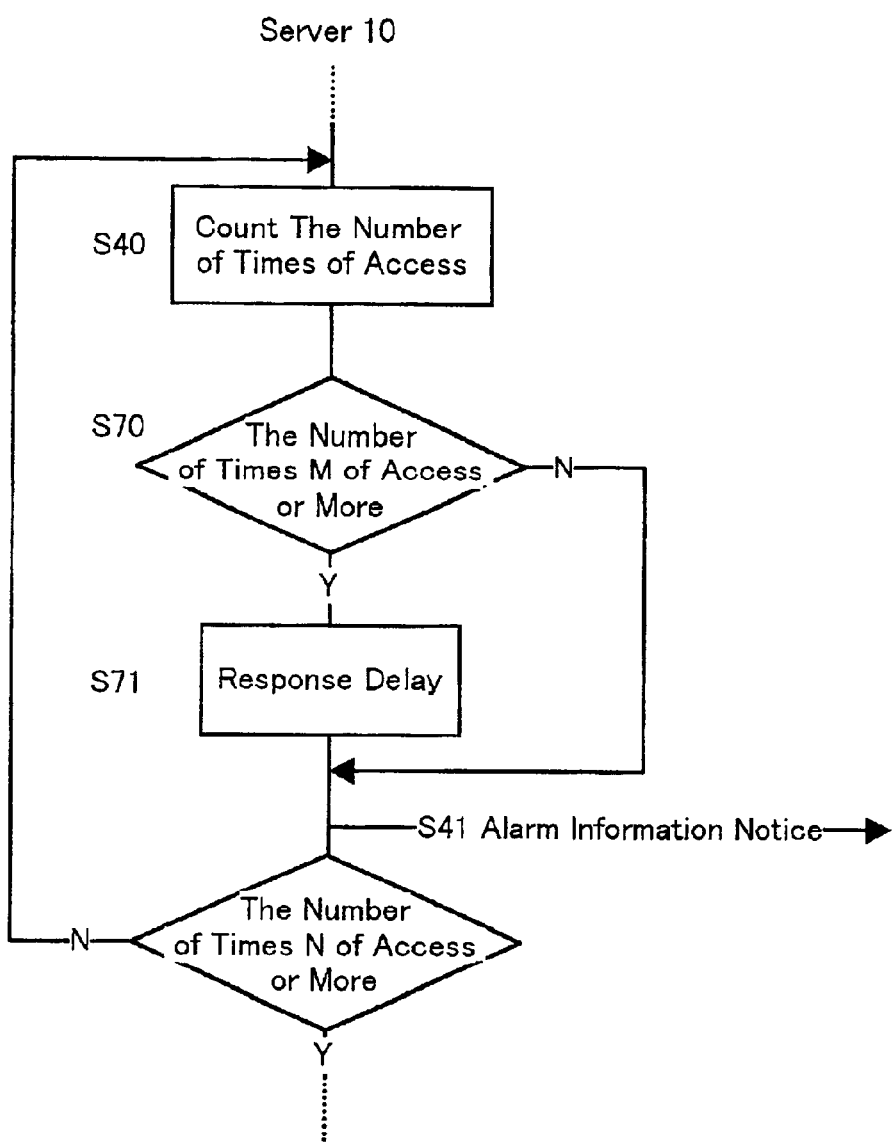
FIG. 13 is a flowchart of a countermeasure method with respect to an improper access according to the embodiment of the present invention.

FIG. 13 is a flowchart of the countermeasure method of the improper access according to another embodiment of the present invention. Incidentally, only a characteristic process part according to this embodiment is described, and the other processes are same as the process content described by use of FIG. 4. Therefore, the description is omitted.

In the process of FIG. 4, the number of times of the access is counted with respect to the improper access by the mala fide user Z, and the alarm information is displayed, and in the case where the number of times of access is the predetermined number of times N or more, the cart ID which is being used so far is invalidated.

In the process of FIG. 13, in the case where the number of times of access as the improper access is less than the predetermined number of times N, and the predetermined number of times M or more, it is a characteristic process that a reply to the terminal 20Z which is being utilized by the user Z is intensively delayed.

First, when the server 10 judges that the improper access by the cart ID changed by the user Z was made, the server 10 starts counting the number of times of access in the cart ID as the target of the improper access (S40).

When the number of times of access is less than N times (here, for example, 7 times) and less than M times (for example, 3 times), the alarm information is promptly noticed to the terminal Z. However, when the number of times of access is less than N times and M times or more, the server 10 delays more than a normal response (S71), and thereafter notices the alarm information to the terminal 20Z (S41). Incidentally, a delay time may be increased in proportion to an increase in the number of times of access. In this manner, the response to the mala fide user is delayed, so that the improper access operations can be prevented.

According to the present invention, as set forth hereinabove, it is possible to prevent the improper access to the cart file which stores temporally the selected commodity data prior to the purchase confirmation in Internet commodity sales.

The scope of protection of the present invention is not intended to be limited to the above embodiments and covers the invention as defined in the appended claims and equivalents thereof.

What is claimed is:

1. A method of a transaction system managing transaction session identifiers in commodity sale transactions via a network, comprising:

issuing, when a user with a terminal starts a transaction session via the network, a session identification code that comprises a combination of a serial number and a predetermined security token, where the serial number identifies the started transaction session and indicates a transaction order in which the transaction with the user was started relative to other transactions of the transaction system, and where the issued session identification code is used by the transaction system to identify and manage the transaction session when the user, by exchanges via the network between the user's terminal and the transaction system, interactively adds/removes commodities to/from the transaction session before its completion; and transmitting the identification code to the user's terminal during the transaction session such that if it is received by the terminal of the user the terminal will display the identification code on the terminal of the user.

2. The method of managing transaction numbers according to claim 1, wherein the network is the Internet.

3. The method of managing transaction session identifiers according to claim 2, further comprising:

displaying the session identification code, as part of a Uniform Resource Locator (URL) of the Internet, on the user's terminal.

4. The method of managing transaction session identifiers according to claim 1, wherein the serial number of the session identification code contains date and time at issuance of the session identification code.

5. The method of managing transaction session identifiers according to claim 1, wherein the session identification code is issued when at least one commodity is selected at the user's terminal, the identification code being utilized until the user decides to purchase the selected commodity.

6. The method of managing transaction session identifiers according to claim 5, wherein the session identification code is invalidated when a predetermined period of time elapses before the user decides to purchase the selected commodity after the issuance of the session identification code.

7. The method of managing transaction session identifiers according to claim 1, wherein the session identification code is issued when an access is made from the user's terminal to the system of the commodity sale transaction, the session identification code being utilized until the user decides to purchase the commodity.

8. The method of managing transaction numbers according to claim 1, further comprising:

when another session identification code is received which coincides only with either the serial number or security token of the identification code, judging an improper access to the identification code to erase the session identification code to reissue a new session identification code.

9. The method of managing transaction session identifiers according to claim 8, further comprising:

upon detection of an improper access to the session identification code, notifying alarm information to a terminal which sent the other identification code.

10. A method according to claim 1, wherein the security token comprises a string that is not derived from or based on transaction order and substantially uniquely identifies the transaction from other transactions.

11. A method according to claim 1, wherein the security token is substantially random relative to other transaction security tokens.

12. A method according to claim 1, wherein the identification code is issued before the user indicates that the transaction is complete and wherein the user adds a commodity to the transaction after the identification code is issued and before the transaction is complete.

13. A method of managing transaction numbers in commodity sale transactions via a network, comprising:

issuing an identification code that comprises receipt information and predetermined password information, the receipt information comprising a serial number that indicates the order in which a predetermined transaction with a user was received;

displaying the identification code on a terminal of the user;

when another identification code is received that coincides only with either the receipt information or password information of the identification code, judging an improper access to the identification code to count the number of times of the access; and when a identification code is received after the number of times of the access has reached a predetermined number of times, erasing the identification code to reissue a new identification code, and displaying the new identification code on the terminal.

14. A method of managing transaction numbers in commodity sale transactions via a network, comprising:

issuing an identification code that comprises receipt information and predetermined password information, the receipt information comprising a serial number that indicates the order in which a predetermined transaction with a user was received;

displaying the identification code on a terminal of the user; and when another identification code is received that coincides only with either the receipt information or password information of the identification code, judging an improper access making use of the identification code to delay a response to the terminal using the another identification code.

15. A computer apparatus acting as a server providing commodity sale transaction sites on the Internet, the computer apparatus executing transactions via the Internet with a user's Internet terminal, the computer apparatus comprising:

an issuance unit to issue, when the user with a terminal starts a transaction session via the Internet, a session identification code that comprises a combination of a serial number and a predetermined security token, where the serial number identifies the started transaction session and indicates a transaction order in which the transaction with the user was started relative to other transactions of the transaction system, and where the issued session identification code is used by the transaction system to identify and manage the transaction session when the user, by exchanges via the Internet between the user's terminal and the transaction system, interactively adds/removes commodities to/from the transaction session before its completion; and a communication unit to send the identification code to the user's terminal during the transaction session such that if it is received by the terminal of the user the terminal will display the identification code on the terminal of the user.

16. A computer apparatus acting as a user's Internet terminal, the computer apparatus executing transactions via the Internet with a server providing commodity sale transaction sites on the Internet, the computer apparatus comprising:

a communication unit to receive a session identification code issued from the server when the user starts a transaction session via the Internet, the session identification code comprising a combination of a serial number and a predetermined security token where the serial number identifies the started transaction session and indicates a transaction order in which the transaction with the user was started relative to other transactions of the transaction system, and where the issued session identification code is used by the transaction system to identify and manage the transaction session when the user, by exchanges via the network between the user's terminal and the transaction system, interactively adds/removes commodities to/from the transaction session before its completion; and transmitting the identification code to the user's terminal during the transaction session such that if it is received by the terminal of the user the terminal will display a display unit to display thereon the identification code as part of Internet URL.

17. A computer program product allowing a computer that executes a commodity sale transaction via the Internet with a user, which, when executed by a computer, causes the computer to perform operations comprising:

issuing, when a user with a terminal starts a transaction session via the network, a session identification code that comprises a combination of a serial number and a predetermined security token, where the serial number identifies the started transaction session and indicates a transaction order in which the transaction with the user was started relative to other transactions of the transaction system, and where the issued session identification code is used by the transaction system to identify and manage the transaction session when the user, by exchanges via the network between the user's terminal and the transaction system, interactively adds/removes commodities to/from the transaction session before its completion; and transmitting the identification code to the user's terminal during the transaction session such that if it is received by the terminal of the user the terminal will display the identification code on the terminal of the user.

18. A method of managing transaction numbers in commodity sale transactions via a network, the method comprising:

issuing a transaction number including receipt information and predetermined password information, the receipt information containing at least a receipt number indicative of the order of receipt of a predetermined transaction with a user;

displaying the transaction number on a terminal of the user;

when another transaction number is received which coincides only with either the receipt information or password information of the transaction number, judging an improper access to the transaction number to count the number of times of the access; and when a transaction number is received after the number of times of the access has reached a predetermined number of times, erasing the transaction number to reissue a new transaction number, and displaying the new transaction number on the terminal.

19. A method of securely conducting an online transaction to purchase a commodity, the method comprising:

starting, over a network, a transaction session between a user's client and a transaction server, where the transaction session is for purchasing a commodity using the transaction server;

responsive to the starting of the transaction session, issuing over the network from the server to the client a session identifier string, where the session identifier string comprises a combination of a transaction identifier and a security token, where the transaction identifier identifies and orders the transaction session relative to other transaction sessions handled by the transaction server, where the security token substantially uniquely identifies the transaction session relative to the other transaction sessions including other transaction sessions of the user; and automatically receiving and displaying the session identifier at the client and allowing the user to interactively add and remove commodities to be purchased via the transaction session during different client-server exchanges that are linked by the transaction server as a single session by the transaction server using the displayed session identifier.

20. A method according to claim 19, wherein the client comprises a browser and the session identifier is displayed by the browser as a URL of a current page displayed by the browser.

* * * * *

UNITED STATES PATENT AND TRADEMARK OFFICE
CERTIFICATE OF CORRECTION

| | |
|---|---|
| PATENT NO. | : 6,965,880 B2 |
| APPLICATION NO. | : 09/750050 |
| DATED | : November 15, 2005 |
| INVENTOR(S) | : Masayuki Komori |

It is certified that error appears in the above-identified patent and that said Letters Patent is hereby corrected as shown below:

Column 13,
Line 7, change "a" to -- an --.

Column 14,
Line 13, after "product" insert -- encoded on a computer readable memory --.
Line 13, change "a" to -- the --.

Signed and Sealed this

Twenty-seventh Day of June, 2006

JON W. DUDAS
*Director of the United States Patent and Trademark Office*